United States Patent
Bush et al.

(10) Patent No.: US 10,500,672 B2
(45) Date of Patent: Dec. 10, 2019

(54) METHODS AND APPARATUS FOR WELDING WORK PIECES HAVING DISSIMILAR COMPOSITIONS

(71) Applicant: FISHER CONTROLS INTERNATIONAL LLC, Marshalltown, IA (US)

(72) Inventors: Donald R. Bush, Marshalltown, IA (US); Nicholas B. Rohrdanz, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 681 days.

(21) Appl. No.: 14/925,685

(22) Filed: Oct. 28, 2015

(65) Prior Publication Data
US 2016/0221106 A1 Aug. 4, 2016

Related U.S. Application Data

(60) Provisional application No. 62/111,876, filed on Feb. 4, 2015.

(51) Int. Cl.
*B23K 9/23* (2006.01)
*B23K 9/04* (2006.01)
(Continued)

(52) U.S. Cl.
CPC ............ *B23K 9/232* (2013.01); *B23K 9/04* (2013.01); *B23K 9/24* (2013.01); *B23K 2101/06* (2018.08);
(Continued)

(58) Field of Classification Search
CPC ............ B23K 2203/04; B23K 2203/18; B23K 2203/05; B23K 2201/001; B23K 9/04;
(Continued)

(56) References Cited

U.S. PATENT DOCUMENTS

| | | | |
|---|---|---|---|
| 4,703,885 A | | 11/1987 | Lindgren et al. |
| 4,975,128 A | * | 12/1990 | Schmitz ............... C21D 6/002 148/520 |

(Continued)

FOREIGN PATENT DOCUMENTS

| | | |
|---|---|---|
| CN | 1757478 | 4/2006 |
| CN | 102310292 | 1/2012 |

(Continued)

OTHER PUBLICATIONS

International Search Report and Written Opinion, issued by the International Searching Authority in connection with International patent application No. PCT/US2016/016490, dated Jun. 14, 2016, 10 pages.

(Continued)

*Primary Examiner* — Ibrahime A Abraham
*Assistant Examiner* — Chris Q Liu
(74) *Attorney, Agent, or Firm* — Hanley, Flight & Zimmerman, LLC (57) ABSTRACT

The example methods and apparatus reduce and/or eliminate adverse effects of welding work pieces having dissimilar compositions. An example method includes depositing a first weld layer on a first end of a first work piece. The first work piece has a first content of a metallic element and the first weld layer has a second content of the metallic element higher than the first content. The example method includes depositing a second weld layer between the first weld layer and a second end of a second work piece to couple the first work piece to the second work piece. The second weld layer has a third content of the metallic element higher than the second content, and the second work piece has a fourth content of the metallic element higher than the first content.

6 Claims, 6 Drawing Sheets

(51) Int. Cl.
  *B23K 103/18* (2006.01)
  *B23K 103/04* (2006.01)
  *B23K 9/24* (2006.01)
  *B23K 101/06* (2006.01)

(52) U.S. Cl.
  CPC ...... *B23K 2103/04* (2018.08); *B23K 2103/18* (2018.08)

(58) Field of Classification Search
  CPC .. B23K 9/1675; B23K 9/321; B23K 2201/06; B23K 2203/26; B23K 2203/50; B23K 9/042; B23K 9/167; B23K 9/173; B23K 9/23; B23K 9/232; B23K 9/02
  USPC ........ 219/137 WM, 137 R, 50, 76.12, 76.14, 219/76.15, 73.21, 77, 136, 137 PS, 219/146.23, 59.1, 61, 74, 76.1; 428/655, 428/660, 663
  See application file for complete search history.

(56) References Cited

U.S. PATENT DOCUMENTS

| | | | |
|---|---|---|---|
| 5,024,582 A | 6/1991 | Bellows et al. | |
| 5,591,363 A * | 1/1997 | Amos | B23K 9/046 219/137 PS |
| 7,371,988 B2 * | 5/2008 | Coleman | B23K 35/004 219/50 |
| 2005/0247763 A1 | 11/2005 | Coleman et al. | |
| 2005/0255333 A1 | 11/2005 | Bartsch et al. | |
| 2005/0255533 A1 | 11/2005 | Bartsch et al. | |
| 2006/0071056 A1 * | 4/2006 | Das | B23K 20/02 228/245 |
| 2008/0067220 A1 | 3/2008 | Bartsch et al. | |
| 2008/0078754 A1 * | 4/2008 | Hosemann | B23K 9/167 219/137 WM |
| 2010/0028705 A1 * | 2/2010 | Keegan | B23K 20/021 428/554 |
| 2011/0305506 A1 * | 12/2011 | Breitenbach | B23K 9/1675 403/272 |
| 2013/0316191 A1 * | 11/2013 | Kawasaki | B23K 9/0026 428/679 |
| 2013/0343899 A1 * | 12/2013 | Nishioka | B23K 9/044 416/229 R |

FOREIGN PATENT DOCUMENTS

| | | |
|---|---|---|
| CN | 205989132 | 3/2017 |
| SU | 585927 | 12/1977 |
| SU | 1175639 | 8/1985 |

OTHER PUBLICATIONS

China National Intellectual Property Administration, "First Office Action", issued in connection with application No. 201610076331.2 dated Jun. 14, 2019, 12 pages.

Federal Service for Intellectual Property (Russia), "Office Action", issued in connection with application No. 2017127542/02(047552) dated Aug. 9, 2019, 13 pages.

* cited by examiner

METHODS AND APPARATUS FOR WELDING WORK PIECES HAVING DISSIMILAR COMPOSITIONS

RELATED APPLICATION

This application claims the benefit under 35 U.S.C. § 119(e) to U.S. Provisional Application No. 62/111,876, titled "METHODS AND APPARATUS FOR WELDING WORK PIECES HAVING DISSIMILAR COMPOSITIONS," filed Feb. 4, 2015, which is incorporated herein by this reference in its entirety.

FIELD OF THE DISCLOSURE

This disclosure relates generally to welding and, more particularly, to methods and apparatus for welding work pieces having dissimilar compositions.

BACKGROUND

Welding is a fabrication process used to join two or more materials together. Welding is utilized in almost every industry, including manufacturing processes and process control plants. In general, welding involves melting two work pieces together and adding a filler material to form a pool of molten material that cools or dries to form a joint. The work pieces are often compositions of metals or metal alloys and the filler material is often a metal or metal alloy. Many different types of welding exist such as, for example, gas tungsten arc welding, gas metal arc welding, flux-cored arc welding, shielded metal arc welding, etc.

When welding together two dissimilar metals and/or metal alloys, metallurgical problems can arise. For example, when welding two work pieces of steel alloy, such as grade 22 steel (e.g., ASTM A387) and grade 91 steel, a steep gradient exists with regard to the chromium content or concentration in the different steels. Grade 22 steel has a chromium content of about 2.25 percent (%) by weight while grade 91 steel has a chromium content of about 9.00% by weight. During post-weld heat treatment and/or during service of the work pieces in a relatively high temperature area, carbon diffusion occurs between the grade 22 steel and the grade 91 steel due to the different chromium contents. Carbon diffusion causes a reduction in strength and/or creep resistance in the lower-chromium metal (i.e., the grade 22 steel). Even when using a filler material having a chromium content that is between the chromium contents of the grade 22 steel and the grade 91 steel, the chromium content gradient still results in carbon diffusion between the grade 22 steel and the grade 91 steel.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

SUMMARY

An example method disclosed herein includes depositing a first weld layer on a first end of a first work piece. The first work piece has a first content of a metallic element and the first weld layer has a second content of the metallic element higher than the first content. The example method includes depositing a second weld layer between the first weld layer and a second end of a second work piece to couple the first work piece to the second work piece. The second weld layer has a third content of the metallic element higher than the second content, and the second work piece has a fourth content of the metallic element higher than the first content.

An example apparatus disclosed herein includes a base to be welded between a first work piece having a first content of a metallic element and a second work piece having a second content of a metallic element to couple the first work piece to the second work piece. The second content is higher than the first content. The base has a composition substantially the same as the first work piece. The base includes a first end and a second end opposite the first end. The apparatus also includes a first weld layer disposed or deposited on the second end of the base. The first weld layer has a third content of the metallic element higher than the first content and lower than the second content. The first end of the base is to be welded to the first work piece, and the second end of the base is to be welded to the second work piece by depositing a second weld layer having a fourth content of the metallic element between the first weld layer and the second work piece. The fourth content is higher than the third content.

Another example method disclosed herein includes melting, via a welder, a first filler material on first end of a first work piece to form a first weld layer. The first work piece has a first content of a metallic element. The example method also includes melting, via the welder, a second filler material between the first weld layer and a second end of a second work piece to form a second weld layer to couple the first work piece to the second work piece. The second work piece has a second content of the metallic element different than the first content. The first filler material and the second filler material have contents that are between the first content and the second content.

DETAILED DESCRIPTION

When welding together dissimilar metals and/or metal alloys, metallurgical problems often arise. Steel, which is generally composed of iron and carbon, is commonly alloyed with other elements (e.g., metallic elements) or constituents (e.g., alloyants) such as manganese, nickel, chromium, molybdenum, vanadium, silicon and boron. The content or percentage by weight (or mass) of these elements may be varied to produce different types of steel alloys. However, when welding steel alloys having different compositions (e.g., different contents of particular elements), metallurgical problem often arise. For example, when welding two work pieces (e.g., two end pieces or parts to be coupled) of steel alloy, such as grade 22 steel and grade 91 steel, a steep gradient (e.g., a relatively large change) exists with regard to the chromium content in the steels. Grade 22 steel has a chromium content of about 2.25 percent (%) by weight, which is lower than the chromium content in grade 91 steel, which has a chromium content of about 9.00% by weight. A steep chromium content gradient is the driving force for carbon diffusion, and during post-weld heat treatment and/or during service in a relatively high temperature/stress environment, carbon diffusion occurs between the different steels as a result of the chromium content gradient. In other words, carbon from the lower-chromium metal (e.g., grade 22 steel) diffuses into the higher-chromium metal (e.g., the grade 91 steel). Carbon diffusion causes a reduction in strength and/or creep resistance in the lower-chromium metal (i.e., the grade 22 steel).

In general, welding involves melting a filler material with the metals/metal alloys of two work pieces to form a molten pool of material that cools to form a weld (e.g., a bead, a weld layer, etc.) that bonds the work pieces together. A filler material may be, for example, a covered electrode, a bare electrode wire and/or a tubular electrode wire. A filler material may have a different composition than the work pieces being welded. For example, the filler material may be a metal alloy having a chromium content that is between the chromium contents of the first and second work pieces (e.g., about 5% chromium by weight). However, even when using such a filler material, a chromium gradient is still present between the lower-chromium metal and the higher-chromium metal and, thus, carbon diffusion occurs.

Example methods and apparatus disclosed herein reduce and/or substantially eliminate adverse effects of welding two work pieces (e.g., two components to be coupled together) having different compositions or contents of elements (e.g., a metallic element, an alloyant). The example methods and apparatus may be used to, for example, reduce and/or substantially eliminate carbon diffusion between two work pieces having different chromium contents. In general, the example methods disclosed herein include depositing weld layers between two work pieces, where the weld layers have compositions (e.g., chemistries) with contents (e.g., by mass or weight percentage) of one or more element(s) (e.g., a metallic element) that falls between the range of compositions or contents of the element(s) in the two work pieces. The resulting weld layers produce a composition that transitions less abruptly from one of the work pieces to the other work piece. For example, with work pieces having different chromium contents (e.g., the weight percentages of chromium are different), the weld layers may have chromium contents that more gradually transition across the weld layers. In other words, the composition of the weld layers at one end are substantially more similar to the composition of one of the work pieces to be welded, while the composition of weld layers at the other end are substantially more similar to the composition of the other work piece to be welded. As a result, the gradient of the chromium content of the weld layers (e.g., the change in the chromium content) between the two work pieces is more gradual. This gradual transition forms a chromium content gradient that may be below a threshold that typically results in carbon diffusion. Therefore, the likelihood of carbon diffusion between the work pieces and the adjacent weld layers and/or across the weld layers is reduced and/or substantially eliminated.

An example apparatus disclosed herein is a transitional piece that is to be welded between two work pieces. The transitional piece includes a base that may be the same material (e.g., having the same chromium content) as a first one of the work pieces. One or more weld layers are disposed on the end of the base that is to be coupled to the second one of the work pieces having a different composition (e.g., the work piece having a different chromium content). The one or more weld layers may have compositions with contents of one or more element(s) (e.g., a metallic element) that increases or decreases in content (e.g., the weight percentage of the element) to provide a transition to the second work piece. For example, the weld layers may have increasing or decreasing chromium contents that result in a relatively less steep (e.g., more gradual or moderate) chromium content gradient across the weld layers. The example transitional piece can be welded between the two work pieces by welding a first end of the base to the first work piece and welding the one or more weld layers (e.g., at a second of the base) to the second work piece. The one or more weld layers create a chromium content that transitions more gradually across the weld layers. The resulting chromium gradient is relatively gradual and, thus, the likelihood of carbon diffusion is reduced and/or substantially eliminated.

The example methods and apparatus disclosed herein may be implemented using any type of welding process that utilizes filler material such as, for example, gas tungsten arc welding (GTAW), gas metal arc welding (GMAW), electroslag welding (ESW), submerged arc welding (SAW), shielded metal arc welding (SMAW) (i.e., stick welding), flux-cored arc welding (FCAW), etc. Other types welding that use a filler material may also be implemented (e.g., gas or oxy acetylene welding with a filler material).

When depositing weld layers using the example methods disclosed herein and/or creating an example transitional piece as disclosed herein, different filler materials having different contents of an element (e.g., a metallic element) may be employed. In some examples disclosed herein, the filler materials are implemented as two or more rods or wires (e.g., wire electrodes or electrode wires) that are twisted or braided together to form a filler material having a composition with a desired content of the metallic element. Using combinations of two or more wires or rods having different contents enables a welder to form a plurality of different weld layers, having a plurality of different possible contents, while employing a few types of commercially-available wire grades. In some examples, a wire feed welder having two wire electrodes is used to create the example weld layers. The wire electrodes may have different contents of the element and the speeds or feed rates of the wires may be adjusted to result in different element contents for the resulting weld layers, for example. Although many of the examples disclosed herein are described in relation to reducing the gradient of the content of a metallic element, such as chromium, between two metal alloys, the example methods and apparatus disclosed herein may be implemented to provide a transition between any different materials that may have adverse effects when welded together. In other words, the examples disclosed herein may be used to join materials having different contents (e.g., mass or weight percentages) of any element (e.g., a metal, a non-metal, a metalloid) that may otherwise produce negative or undesired effects if welded together (e.g., a decrease in strength).

Figure 1:
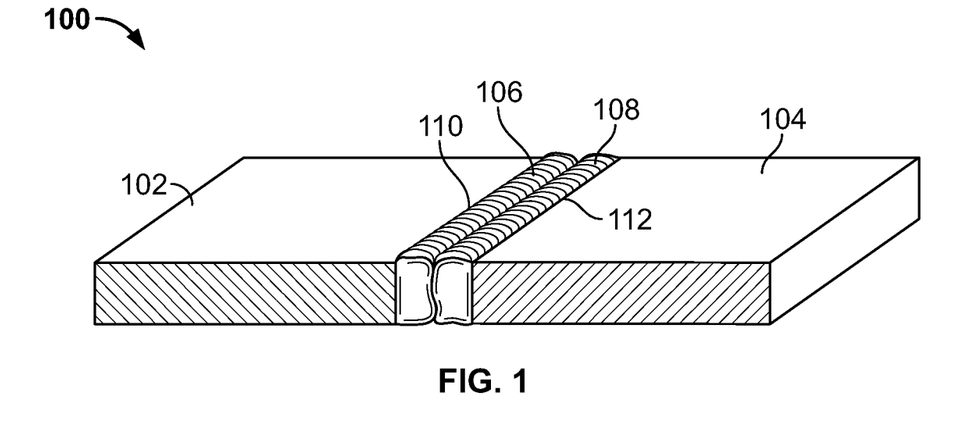
FIG. 1 is a perspective cross-sectional view of two work pieces welded together using two example weld layers in accordance with example methods of this disclosure.

Turning now to the figures, FIG. 1 illustrates an example weld 100, implemented in accordance with example welding methods disclosed herein, to reduce and/or eliminate adverse or negative effects produced when welding two work pieces having different compositions or contents of an alloyant or metallic element (e.g., a transition metal such as vanadium, tungsten, titanium, niobium, etc.). For example, the weld 100 may be used to reduce and/or substantially eliminate carbon diffusion between two work pieces having different chromium contents. In the illustrated example, a first work piece 102 is coupled (e.g., joined) to a second work piece 104 via the example weld 100. The first work piece 102 may be a metal alloy having a first chromium content and the second work piece 104 may be another metal alloy having a second chromium content that is higher than the first chromium content of the first work piece 102. For example, the first work piece 102 may be grade 22 steel alloy, which has a chromium content (e.g., a nominal chromium content) of about 2.25% by weight, and the second work piece 104 may be grade 91 steel alloy, which has a chromium content of about 9.00% by weight. Therefore, if the first and second work pieces 102, 104 were welded together using known techniques, a chromium content gradient would exist across the weld between the first and second work pieces 102, 104. As a result, carbon in the first work piece 102 (e.g., the lower-chromium work piece) would diffuse or migrate toward the second work piece 104 (e.g., the higher-chromium work piece) and, thus, the strength and/or creep resistance in the first work piece 102 would be reduced.

To reduce carbon diffusion between the first and second work pieces 102, 104, the example weld 100 includes a first weld layer 106 and a second weld layer 108. The first weld layer 106 is deposited (e.g., "buttered," patterned, laid) on a first end 110 of the first work piece 102 and has a chromium content that is higher than the first chromium content of the first work piece 102 and lower than the second chromium content of second work piece 104. The second weld layer 108, which is deposited between the first weld layer 106 and a second end 112 of the second work piece 104, has a chromium content that is higher than the chromium content of the first weld layer 106 (and/or the first work piece 102) and lower than the second chromium content of the second work piece 104. For example, the first weld layer 106 may have a chromium content of about 4.00% by weight and the second weld layer 108 may have a chromium content of about 6.00% by weight. In other words, the chromium content gradually increases between the first end 110 of the first work piece 102 and the second end 112 of the second work piece 104. As a result, the gradient of the chromium content formed between the first end 110 of the first work piece 102 and the second end 112 of the second work piece 104 is less steep or more gradual than produced with known techniques and, thus, the likelihood of carbon diffusion is reduced or substantially eliminated.

In the illustrated example of FIG. 1, two weld layers form the example weld 100. However, in other examples, more than two weld layers may be used to form the example weld 100. In such an example, each of the weld layers, beginning with weld layer closest to the first work piece 102, has a progressively increasing chromium content. As a result, the chromium content gradient between the first and second work pieces 102, 104 is reduced or lessened. Further, although this method is described as starting with the lowest chromium content weld layer, this process may be performed in reverse. In other words, the second weld layer 108 may be deposited on the second end 112 of the second work piece 104 and then the first weld layer 106 may be deposited between the second weld layer 112 and the first end 110 of the first work piece 102 to couple the first and second work pieces 102, 104 together.

Figure 2:
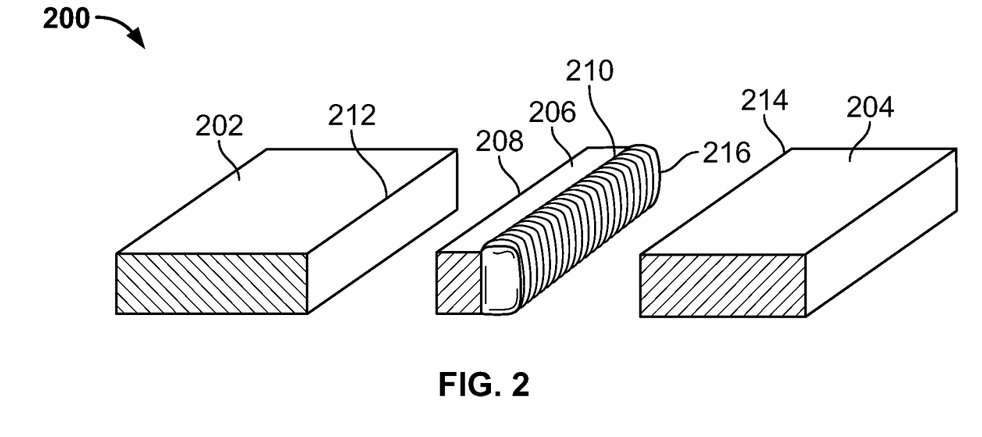
FIG. 2 is a perspective cross-sectional view of an example transitional piece used to couple a first work piece and a second work piece.

FIG. 2 illustrates an example transitional piece 200 that may be used to couple two work pieces having different compositions or contents of an alloyant or metallic element (e.g., a transition metal) and to reduce negative or adverse effects of welding such work pieces together. The transitional piece 200 may be used to reduce the carbon diffusion between the work pieces having different chromium contents, for example. In the illustrated example, a first work piece 202 is to be coupled to a second work piece 204. Similar to the work pieces described in FIG. 1, the first work piece 202 may be a metal alloy (e.g., grade 22 steel) having a first chromium content and the second work piece 204 may be another metal alloy (e.g., grade 91 steel) having a second chromium content that is higher than the first chromium content of the first work piece 202.

To couple or join the first and second work pieces 202, 204, the transitional piece 200 may be welded between the first and second work piece 202, 204. In the illustrated example, the transitional piece 200 includes a base 206 having a first end 208 and second end 210. In the illustrated example, the base 206 is implemented as substantially the same material as the first work piece 202 and/or a material having a chromium content that is substantially similar to the first chromium content of the first work piece 202. The first end 208 of the base 206 may be welded to the end 212 of the first work piece 202 using a filler material (e.g., an electrode wire) that has substantially the same chromium content as the first work piece 202 and/or the base 206. As a result, no substantial chromium gradient is produced and, thus, no carbon diffusion would occur between the first work piece 202 and the base 206 of the transitional piece 200. To reduce the likelihood of carbon diffusion between the base 206 and the second work piece 204 (e.g., which has a relatively higher chromium content), the transitional piece 200 includes a first weld layer 216. In the illustrated example, the first weld layer 216 has a chromium content that is higher than the chromium content of the base 206 and lower than the second chromium content of the second work piece 204. To couple the transitional piece 200 to the second work piece 204, a weld layer having a chromium content that is higher than the chromium content of the first weld layer 204 and less than the chromium content of the second work 204 may be deposited between the first weld layer 204 and the end 214 of the second work piece 204. As a result, the chromium content gradient is relatively less steep or more gradual and, thus, the likelihood carbon diffusion is reduced and/or substantially eliminated.

Figure 3:
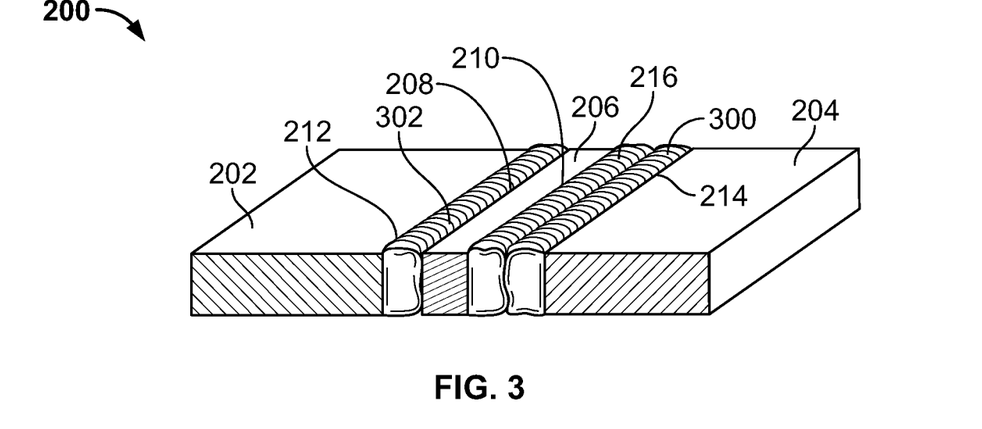
FIG. 3 is a perspective cross-sectional view of the example transitional piece of FIG. 2 coupled between the first and second work pieces.

FIG. 3 illustrates the example transitional piece 200 welded between the first and second work pieces 202, 204. In the illustrated example, a second weld layer 300 is deposited between the first weld layer 216 and the end 214 of the second work piece 204. As described above, the second weld layer 300 may have a chromium content that is higher than first weld layer 216 and lower than the second chromium content of the second work piece 204. Therefore, the chromium content gradient between the second end 210 of base 206 and the second work piece 204 is relatively less steep and, thus, the likelihood of carbon diffusion is reduced and/or substantially eliminated. Additionally, to couple the first work piece 202 to the transitional piece 200, a third weld layer 302 is deposited between the first end 208 of the base 206 of the transitional piece 200 and the end 212 of first work piece 202. As described above, the third weld layer 302 is a material that is substantially similar to and/or has a chromium content that is substantially similar to the first work piece 202 and/or the base 206. As a result, no carbon diffusion would occur between the first work piece 202 and the base 206 (e.g., because the materials and/or chromium contents of the first work piece 202, the third weld layer 302 and the base 206 are all the substantially the same).

In some examples, many different types of example transitional pieces may be manufactured so that instead of depositing each of the weld layers between the two dissimilar work pieces, a transitional piece may be coupled between the two work pieces via one weld at each end of the transitional piece. For example, transitional pieces having different base materials and/or weld layers with different metallic element contents (e.g., different chromium contents) may be manufactured for different combinations of work pieces. An appropriate transitional piece may be selected and welded between the two work pieces to couple the two work pieces together.

In the illustrated example of FIGS. 2 and 3, the base 206 of the transitional piece 200 is implemented as a material that is substantially similar to and/or has a chromium content that is substantially similar to the first work piece 202. However, in other examples, the base 206 of the transitional piece 200 may instead be implemented as a material that is substantially similar to and/or has a chromium content that is substantially similar to the second work piece 204. In such an example, one or more weld layers may instead be deposited on the first end 208 of the base 206 to reduce and/or substantially eliminate the carbon diffusion between the base 206 and the first work piece 202. In some examples, the base 206 may be a material having a chromium content that is different than the first work piece 202. For example, the base 206 may have a chromium content that is higher than the first chromium content of the first work piece 202. In such an example, the third weld layer 302 may have a chromium content that is between the first chromium content of the first work piece 202 and the chromium content of the base 206. As a result, the chromium content gradient between the first work piece 202 and the second work piece 204 is relatively less steep and, thus, the likelihood of carbon diffusion is reduced and/or substantially eliminated.

Additionally, although only two weld layers (e.g., the first weld layer 216 and the second weld layer 300) are employed in FIG. 3 between the base 206 of the transitional piece 200 and the second work piece 204, in other examples, more than two weld layers may be deposited between the base 206 and the second work piece 204. Although the example work pieces 102, 104, 202, 204 illustrated in FIGS. 1-3 are substantially planar (e.g., sheets of metal), the disclosed methods and/or transitional pieces may be used with any type of work pieces having any desired shapes or geometries.

Figure 4:
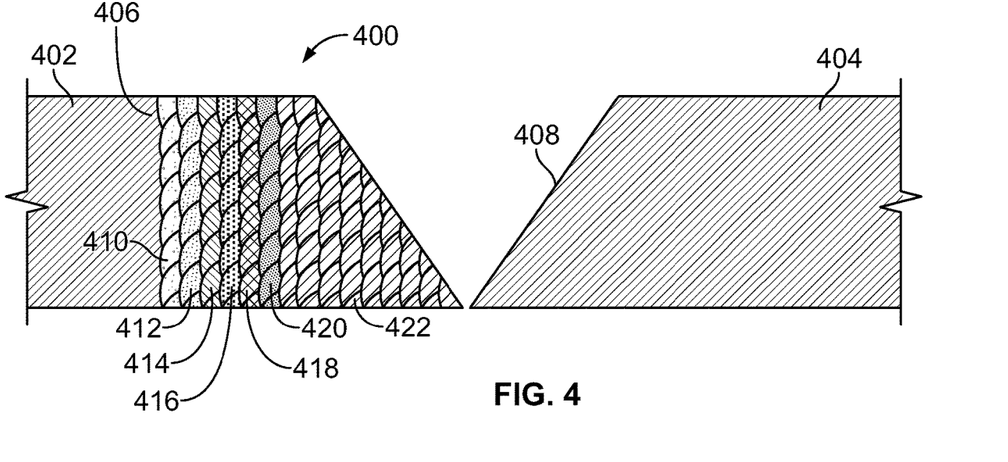
FIG. 4 is cross-sectional view of walls of a first work piece implemented as a first pipe and a second work piece implemented as a second pipe that are to be welded together. A plurality of example weld layers in the form of a first bevel are disposed on an end of the first work piece.

For example, FIG. 4 illustrates a cross-section of walls of two pipes that are to be joined. An example plurality of weld layers 400 is implemented to couple a first work piece or pipe 402 to a second work piece or pipe 404. The first work piece 402 has a first chromium content and the second work piece 404 has a second chromium content, which is higher than the first chromium content of the first work piece 402. A butt weld is typically used to join two pipes together and involves beveling the exterior of the both of the pipe ends to form a groove at the abutted pipe ends where a weld layer can be deposited. In the illustrated example, an end 406 of the first work piece 402 is to be coupled to an end 408 of the second work piece 404. The weld layers 400 are deposited onto the end 406 of the first work piece 402. In the illustrated example, the weld layers 400 include a first weld layer 410, a second weld layer 412, a third weld layer 414, a fourth weld layer 416, a fifth weld layer 418 a sixth weld layer 420 and a seventh weld layer 422. To produce a relatively low chromium content gradient, each of the successive layers 410-422 (from left to right in FIG. 4) has an increasing chromium content relative to the previous or adjacent weld layer. For example, the first weld layer 410 has a chromium content that is higher than the first chromium content of the first work piece 402, the second weld layer 412 has a chromium content that is higher than the first weld layer 410, the third weld layer 414 has a chromium content that is higher than the second weld layer 412, the fourth weld layer 416 has a chromium content that is higher than the third weld layer 414, the fifth weld layer 418 has a chromium content that is higher than the fourth weld layer 416, the sixth weld layer 420 has a chromium content that is higher than the fifth weld layer 418, and the seventh weld layer 422 has a chromium content that is higher than the sixth weld layer 420. In the illustrated example, the seventh weld layer 422 is formed by a plurality of passes. In other examples, more or fewer passes may be performed.

In the illustrated example, the example weld layers 400 are beveled (e.g., angled, tapered) to form a groove between the weld layers 400 and the end 408 of the second work piece 404, which is also beveled. In some examples, the weld layers 400 are deposited onto the end 406 of the first work piece 402 and then ground or cut to form the bevel. Additionally or alternatively, the weld layers 400 may be deposited at a decreasing width on the end 406 of the first work piece 402 to form the bevel. For example, when depositing the seventh weld layer 422 with a plurality of passes, each of the passes (from left to right in FIG. 4) may deposit a narrower weld layer than the previous pass to form the bevel.

Figure 5:
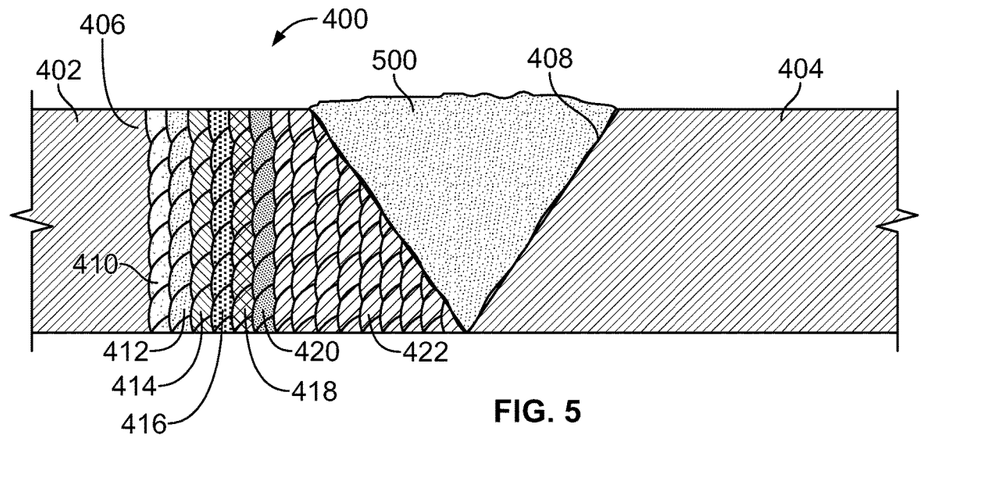
FIG. 5 is a cross-sectional view of the first and second work pieces of FIG. 4 welded together.

In the illustrated example of FIG. 5, a final weld layer 500 is deposited between the plurality of welds 400 and the end 408 of the second work piece 404 to couple the first work piece 402 to the second work piece 404. The final weld layer 500 may have a chromium content that is substantially similar to the seventh weld layer 422 and/or the second chromium content of the second work piece 404. In some examples, the final weld layer 500 has a chromium content that is higher than the seventh weld layer 422 and lower than the second chromium content of the second work piece 404. As a result, the chromium content gradient between the end 406 of the first work piece 402 and the end 408 of the second work piece 404 is less steep and, thus, the likelihood of carbon diffusion is reduced and/or substantially eliminated.

In some examples, the first work piece 402 and the plurality of weld layers 400 form a transitional piece that may be welded between two pipes to couple two pipes together. For example, an opposite end of the first work piece 402 may be welded to another pipe (e.g., an upstream pipe), and the end 406 with the plurality of weld layers 400 may be welded to the second work piece 404 (e.g., a downstream pipe), to couple the pipes together.

Figure 6:
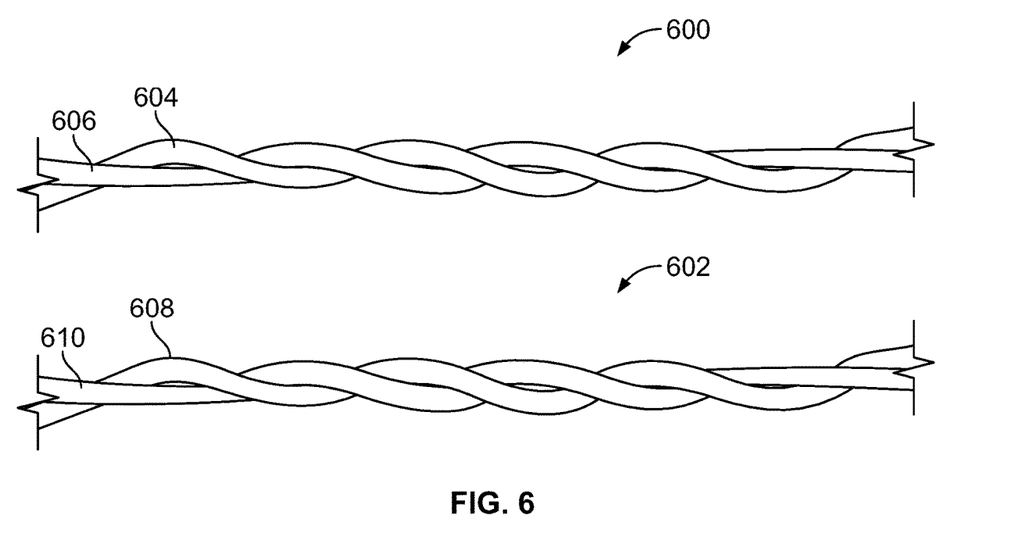
FIG. 6 illustrates example filler materials that may be used to form any of the example weld layers of FIGS. 1-5.

In the illustrated examples of FIGS. 1-5, the example weld layers 106, 108, 216, 300, 302, 410-422, 500 are formed by melting a filler material onto or between adjacent materials. In some examples, the filler materials may have different contents of the alloyant or metallic element (e.g., chromium). In some examples, multiple filler materials may be combined to produce a resultant filler material having a composition with a desired metallic element content for the corresponding weld layer. For example, FIG. 6 illustrates a first example filler material 600 and a second example filler material 602 that may be used to form one or more of the example weld layers 106, 108, 216, 300, 302, 410-422, 500 of FIGS. 1-5. In the illustrated example, the first filler material 600 includes a first wire or rod 604 and a second wire or rod 606 that are twisted or braided together. The first filler material 600 may be deposited using, for example, GTAW. In the illustrated example, the first wire 604 and the second wire 606 have different chromium contents. However, when melted together via the GTAW process, the resulting chromium content is based on the chromium contents of the first and second wires 604, 606. In the illustrated example, the second filler material 602 is also formed of a first wire or rod 608 and a second wire or rod 610, having different chromium contents, and twisted or braided together. The first filler material 600 and the second filler material 602 may be used to form the respective first and second weld layers 106, 108 of the example weld 100 of FIG. 1.

For example, the first work piece 102 of FIG. 1 may be grade 22 steel, which has a chromium content of about 2.25% by weight and the second work piece 404 may be grade 91 steel, which has a chromium content of about 9.00% by weight. The first wire 604 and/or the second wire 606 of the first filler material 600 may have a chromium content that is higher than the first chromium content of the first work piece 102. As a result, the first weld layer 106 would have a chromium content that is higher than the first chromium content of the first work piece 102. For example, the first wire 604 may have a chromium content of about 4.00% by weight and the second wire 606 may have a chromium content of about 6.00% by weight. When the first filler material 600 is melted to produce the first weld layer 106, the resulting first weld layer 106 has a chromium content of about 5.00% by weight, for example. Therefore, the first weld layer 106 would have a chromium content that is higher than the first chromium content (e.g., about 2.25% by weight) of the first work piece 102. Further, the first wire 608 and/or the second wire 610 of the second filler material 602 may have a chromium content that is higher than either or both of the first and second wires 604, 606 of the first filler material 600 and/or lower than the second chromium content of the second work piece 104. As a result, the second weld layer 108 would have a chromium content that is higher than first weld layer 106 and lower than the second chromium content of the work piece 104. For example, the first wire 608 may have a chromium content of about 6.00% and the second wire 610 may have a chromium content of about 8.00% by weight. When the second filler material 602 is melted to produce the second weld layer 108, the resulting second weld layer 108 would have a chromium content of about 7.00% by weight, for example. Therefore, the second weld layer 108 would have a chromium content that is higher than the first weld layer 106 and lower than the second chromium content (e.g., about 9.00% by weight) of the second work piece 104. This example method can be repeated multiple times depending on the number of weld layers that are to be used. Therefore, a plurality of weld layers can be formed with a few wires or rods, each having a different content of the alloyant or metallic element (e.g., chromium), by combining the wires in different combinations to form filler materials having desired alloyant or metallic element contents for the corresponding weld layers.

Figure 7:
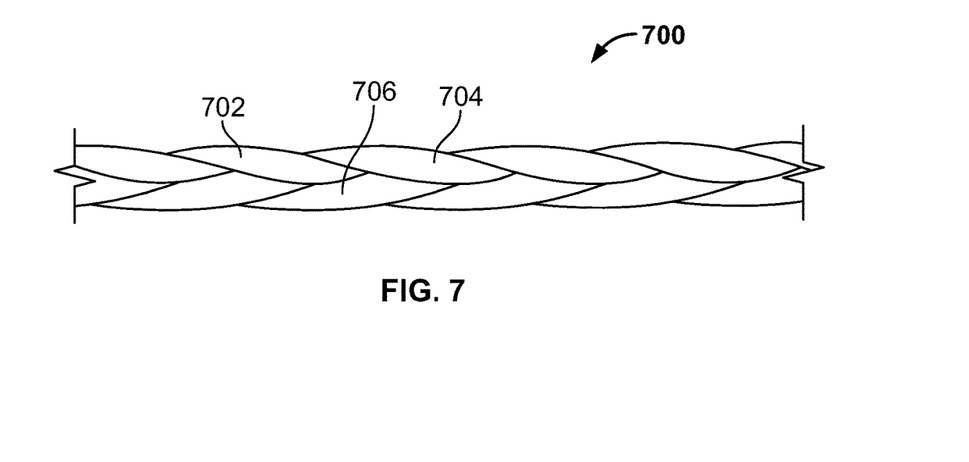
FIG. 7 illustrates another example filler material that may be used to form any of the example weld layers of FIGS. 1-5.

FIG. 7 illustrates another example filler material 700 that may be used to produce one or more of the example weld layers 106, 108, 216, 300, 302, 410-422, 500 of FIGS. 1-5. The example filler material 700 includes a first wire or rod 702, a second wire or rod 704 and a third wire or rod 706 that are twisted or braided together. Similar to the example first and second filler materials 600, 602 of FIG. 6, different combinations of wires may be used to form the filler material 700.

For example, the first work piece 402 of FIGS. 4 and 5 may be grade 22 steel, which has a chromium content (e.g., a nominal chromium content) of about 2.25% by weight, and the second work piece 404 may be grade 91 steel, which has a chromium content of about 9.00% by weight. Table 1 below illustrates example combinations of three types of wires (e.g., wire electrodes, filler materials) that may be used to form the filler material 700 for each of the example weld layers 410-422 of FIGS. 4 and 5.

TABLE 1

| Weld Layer | Cr (%) by weight | Number of Wires in Braid | | |
|---|---|---|---|---|
| | | -B3 | -B6 | -B8 |
| 410 | 2.36 | 3 | 0 | 0 |
| 412 | 3.48 | 2 | 1 | 0 |
| 414 | 4.51 | 2 | 0 | 1 |
| 416 | 5.64 | 1 | 1 | 1 |
| 418 | 6.66 | 1 | 0 | 2 |
| 420 | 7.79 | 0 | 1 | 2 |
| 422 | 8.81 | 0 | 0 | 3 |

"-B3" may be, for example, ER90S-B3, which has a chromium content in the range of about 2.30-2.70% by weight, "-B6" may be, for example, ER80S-B6, which has a chromium content in the range of about 4.50-6.00% by weight and "-B8" may be, for example, ER80S-B8, which has a chromium content in the range of about 8.00-10.50% by weight. As illustrated in Table 1, to form the filler material 700 for the first weld layer 410, all three of the wires 702-706 are implemented as -B3. The resulting first weld layer 410 has a chromium content of about 2.36% by weight. Therefore, the first weld layer 410 may have a higher chromium content than the chromium content of the first work piece 402, which may range have a range of about 1.90-2.60%, for example. To form the filler material 700 for the second weld layer 412, as illustrated in Table 1, two of the wires 702-706 are implemented as -B3 and one of the wires 702-706 is implemented as -B6. The resulting second weld layer 412 has a chromium content of about 3.48% by weight. Therefore, the chromium content of the second weld layer 412 (e.g., about 3.48% by weight) is higher than the chromium content of the first weld layer 410 (e.g., about 2.36% by weight). As illustrated in the example Table 1, this process can continue for each of the weld layers 410-422. Each of the layers has an increasing chromium content (e.g., 2.36%, 3.48%, 4.51%, etc.) the further away from the first work piece 402. To form the filler material 700 for the seventh weld layer 422, as illustrated in Table 1, all three of the wires 702-706 are implemented as -B8, which results in a weld layer with a chromium content of about 8.81% by weight. Thus, the chromium content of the seventh weld layer 422 is below the chromium content of the second work piece 402, which may have a range of about 8.00-9.50%, for example. By creating a plurality of weld layers in which successive weld layers have gradually increasing chromium contents, the chromium content gradient across the weld layers 410-422 is less than a threshold that causes carbon diffusion. Thus, the carbon diffusion is reduced and/or substantially eliminated.

In this example, three wires or rods are used to form the filler material 700. However, in other examples, more or fewer types of wires or rods may be employed to form the filler materials for the different weld layers 410-422. Additionally, the wires 702-706 may be other types of wires or rods having different compositions.

Figure 8:
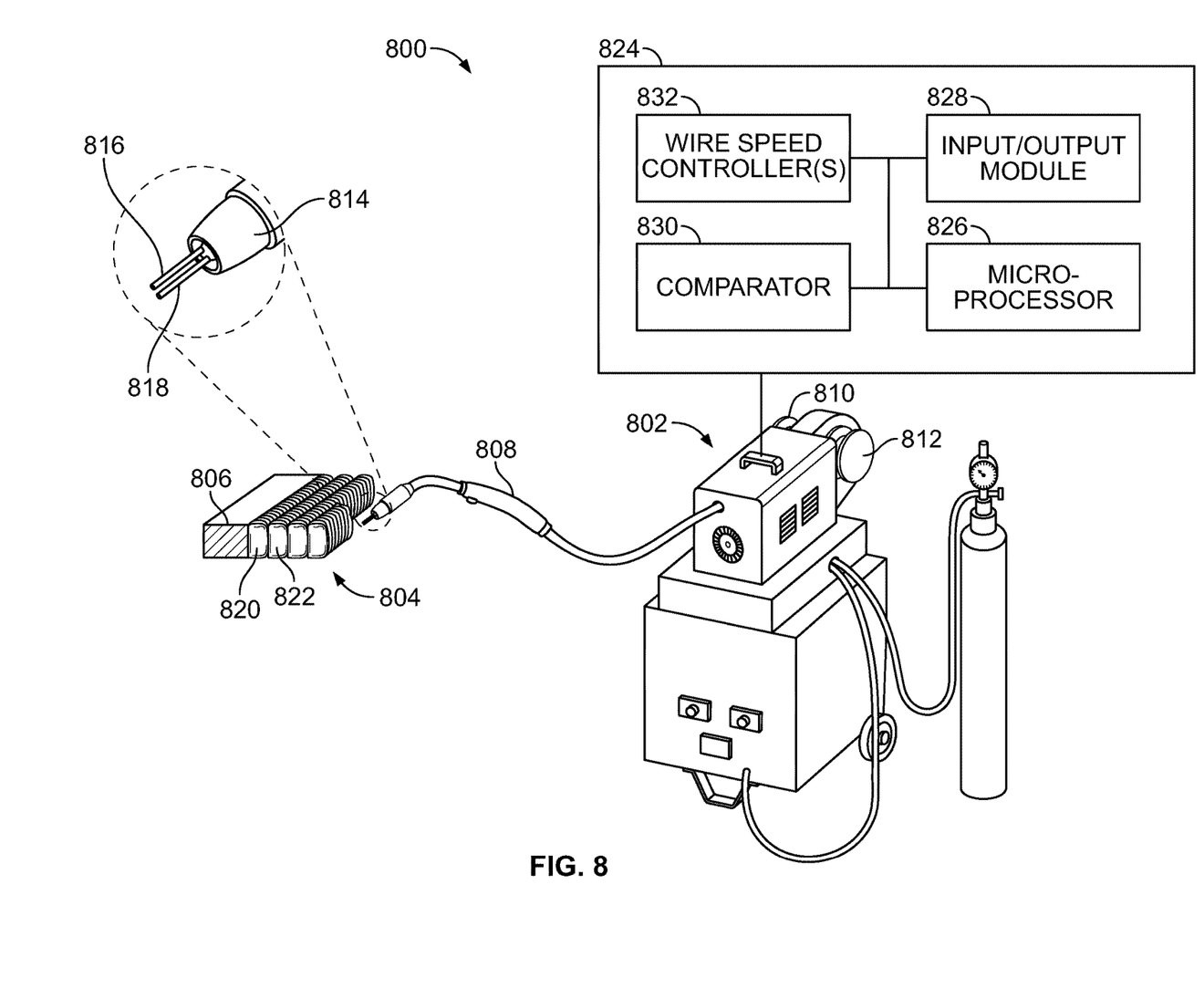
FIG. 8 is a schematic of an example welding system having an example wire feed welder that may be used to form any of the example weld layers of FIGS. 1-5.

FIG. 8 illustrates an example system 800 for reducing and/or substantially eliminating negative or adverse effects of coupling two work pieces having different compositions or contents of an alloyant or metallic element (e.g., a transition element) via welding. The example system 800 may be used to produce any of the example weld layers of FIGS. 1-5. The example system 800 may be used, for example, to reduce the carbon diffusion between two work pieces joined by a weld.

In the illustrated example, a wire feed welder 802 is used to deposit a plurality of example weld layers 804 on a work piece 806. The first work piece 806 may have a first content of a metallic element such as chromium. The wire feed welder 802 may be, for example, a GMAW welder, a flux core welder, etc. The wire feed welder 802 includes a handle or gun 808. In the illustrated example, the wire feed welder 802 includes two spools 810, 812 of filler materials (e.g., wire electrodes) that are fed through a tip 814 of the gun 808. The first spool 810 feeds a first wire 816 and the second spool 812 feeds a second wire 818. The first and second wires 816, 818 may have different contents of the metallic element (e.g., different contents of chromium).

The wire feed welder 802 of the illustrated example is used to deposit weld layers formed by the first wire 816 and/or the second wire 818. To provide weld layers having different contents of the metallic element, the feed rates of the first and second wires 816, 818 of the example system 800 are independently adjustable. For example, during a first pass to form a first weld layer 820, a first feed rate for the first wire 816 may be relatively high and a second feed rate for the second wire 818 may be relatively low. As a result, more of the first wire 816 is melted to form the first weld layer 820. If the first wire 816 has a lower content of the metallic element than the second wire 818, for example, then the first weld layer 820 also has a relatively lower content of the metallic element. For example, if the metallic element is chromium, then the resulting first weld layer 820 has a relatively lower chromium content. The resulting chromium content of the first weld layer 820 may be higher or lower than the chromium content of the work piece 806, depending on the contents of the chromium in the first and second wires 816, 818. During a second pass to form a second weld layer 822, the feed rates of the first and second wires 816, 818 may be altered. For example, a first feed rate of the first wire 816 may be lower than the feed rate of the first wire 816 during the first pass for the first weld layer 820. Additionally or alternatively, a second feed rate for the second wire 818 may be higher than the feed rate of the second wire 818 during the first pass for the first weld layer 820. If the second wire 818 has a relatively higher content of the metallic element than the first wire 816, for example, then the second weld layer 822 also has a relatively higher content of the metallic element (e.g., higher than the first weld layer 820). For example, if the metallic element is chromium, the resulting second weld layer 822 has a relatively higher chromium content. This method may be used to deposit multiple weld layers having desired contents of the metallic element.

The example system 800 may employ a control system 824 to operate the feed rates of the first and second wires 816, 818. The control system 824 of the illustrated example includes a microprocessor 826, an input/output module 828, a comparator 830 and a wire speed controller 832. For example, a welding technician may input a desired chromium content or speed rate for the first and second wires 816, 818 to produce a weld layer with a particular chromium content. The chromium content may be based on a plurality of factors including, for example, the type of material of the first and second wires 816, 818, the speeds of the first and second wires 816, 818, the type of shielding gas used, the voltages applied to the first and second wires 816, 818, the type of material to be welded, etc. As the first and second wires 816, 818 are fed, a signal corresponding to the target or desired speeds is provided to the microprocessor 826 via the input/output module 828. The control system 824 may determine if the speed rates of the first and second wires 816, 818 are within a certain range or threshold to produce the desired weld layer. For example, the comparator 830 may compare the speed rates of the first and second wires 816, 818 with a threshold provided by, for example, reference data. The reference data may include, for example, a table of threshold speed rates for different types of wires based on a number of factors including, for example, the type of material being welded, the type of shielding gas, etc. If the feed rates of the first and second wires 816, 818 are too fast and/or too slow, the wire speed controller(s) 832 may adjust the speeds of the spools 810, 812, which changes the feed rates of the first and second wires 816, 818. This operation may be performed for each weld layer the welding technician desires to deposit. In some examples, the welding may be performed by a welding robot. In such an example, the feed rates of the first and second wires 816, 818 may be stored in the software or coding of a program that is executed to automatically control the robot to produce the desired weld layers.

Figure 9:
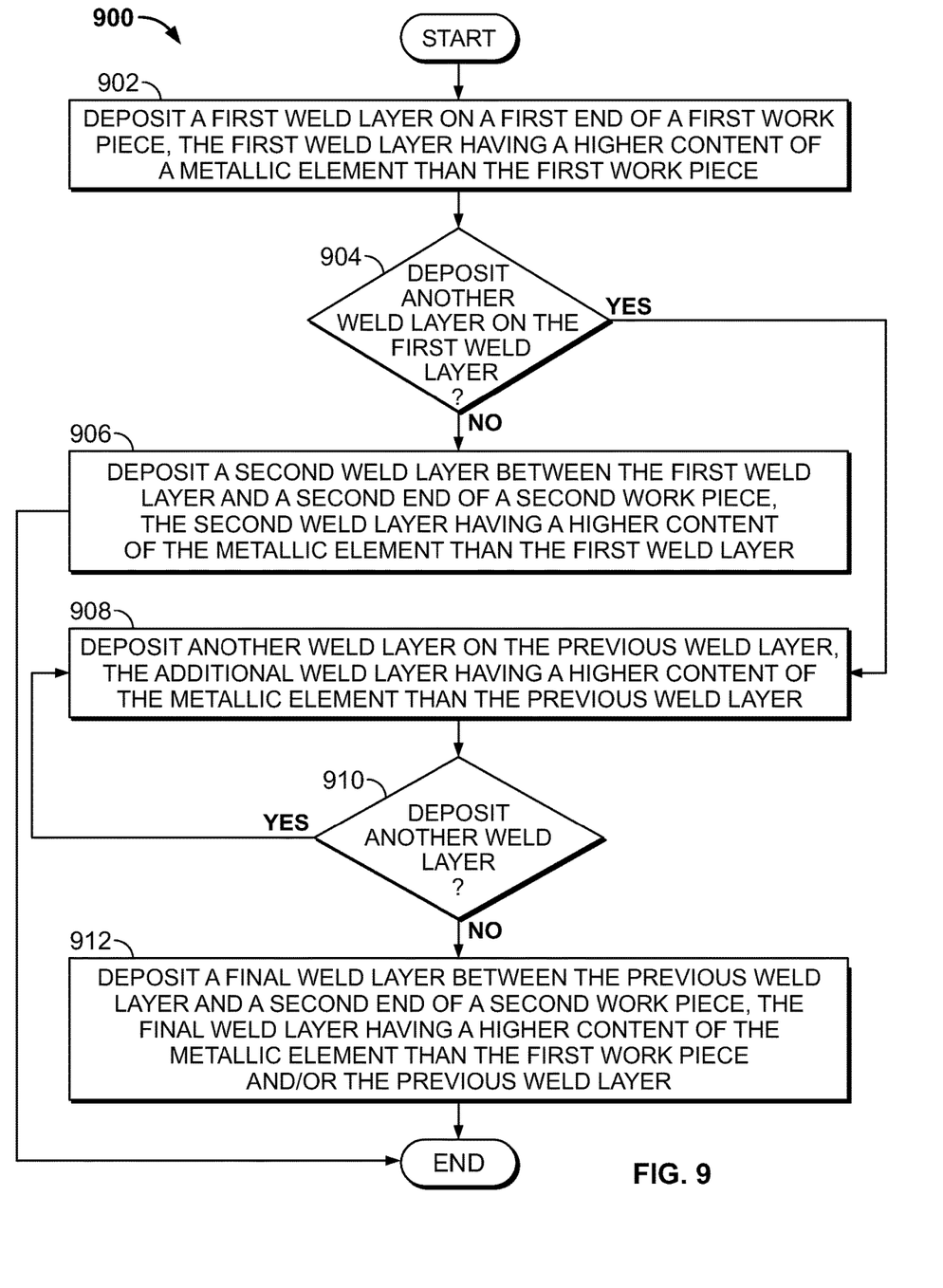
FIG. 9 is a flowchart illustrating an example method of welding two work pieces together that may be implemented using the example filler materials of FIGS. 6 and 7 and/or the example welding system of FIG. 8 to form any of the example weld layers of FIGS. 1-5.

A flowchart representative of an example method for coupling two work pieces having different compositions or contents of an alloyant or metallic element and for reducing and/or substantially eliminating negative or adverse effects of coupling the work pieces by a weld is shown in FIG. 9. The example method illustrated in FIG. 9 may be used to create any of the example welds of FIGS. 1-5 and 8 and/or implement the example system 800 of FIG. 8. In this example, at least a portion of the method may be implemented using machine readable instructions that comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of producing the example welds of FIGS. 1-5 and 8 and/or implementing the example system 800 of FIG. 8 may alternatively be used. For example, the order of execution of the blocks may be changed, and/or some of the blocks described may be changed, eliminated, or combined.

As mentioned above, at least a portion of the example method of FIG. 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 9 illustrates an example flowchart representative of an example method 900 for coupling two work pieces having different compositions or contents of an alloyant or metallic element (e.g., a transition metal) and for reducing and/or substantially eliminating negative or adverse effects of coupling the work pieces by a weld. The example method 900 may be used to create one or more of the example welds in FIGS. 1-5 and/or implement the example system 800 of FIG. 8. The example method 900 may be implemented to deposit one or more weld layers between two work pieces having dissimilar compositions such as, for example, a first work piece having a chromium content that is lower than a chromium content of a second work piece. The example method 900 includes depositing a first weld layer on a first end of a first work piece (block 902). In the illustrated example, the first weld layer has a content of a metallic element that is higher than a content of the metallic element in the first work piece. For example, in the illustrated example of FIG. 1, the first weld layer 106 has a higher chromium content than the first chromium content of the first work piece 102. In the example method 900, the first weld layer may be deposited using any type of welding process including, for example, GTAW, GMAW, flux-core, etc. The example first weld layer may be deposited using a filler material having a desired content of the metallic element (e.g., chromium). In some examples, the filler material is formed by two or more wires or rods that are twisted or braided together such as, for example, the filler materials 600, 602, 700 of FIGS. 6 and 7. The wires or rods may have different contents of the metallic element and, when melted together, form a resulting content of the metallic element. For example, as illustrated in FIGS. 6 and 7, the filler materials 600, 602, 700 may be used to produce weld layers having different contents of chromium. Additionally or alternatively, a wire feed welder may be utilized to produce the first weld layer. For example, in the example system 800, the wire feed welder 802 feeds the first and second wires 816, 818 at different rates to produce weld layers of having differing contents of the metallic element. In such an example, the method 900 may include wire feed welding a first wire and a second wire to the first end of the first work piece.

The example method 900 includes determining whether to deposit another weld layer on the first weld layer (block 904). If another weld layer is not to be deposited, the example method 900 includes depositing a second weld layer between the first weld layer and a second end of a second work piece (block 906). The second work piece has a higher content of the metallic element than the first work piece, and the second weld layer may have a higher content of the metallic element than the first weld layer. As a result, the gradient of the metallic element content between the first end of the first work piece and the second end of the second work piece is relatively gradual and, thus, the likelihood of adverse affects is reduced and/or substantially eliminated. For example, in FIG. 1, the first and second weld layers 106, 108 provide a gradual transition of the chromium content between the first and second work pieces 102, 104. As a result, the gradient of the chromium content between the first and second work pieces 102, 104 is relatively more gradual and, thus, the likelihood of carbon is reduced and/or substantially eliminated. The second weld layer may be deposited similar to the first weld layer. For example, the second weld layer may be deposited using any type of welding process including, for example, GTAW, GMA, flux-core, etc. The example second weld layer may be deposited using a filler material having a desired content of the metallic element. In some examples, the filler material of the second weld layer is formed by two or more wires or rods that are twisted or braided together such as, for example, the filler materials 600, 602, 700 of FIGS. 6 and 7. One or more of the wires for the filler material of the second weld layer may be similar to the one or more of the wires of the filler material for the first weld layer (block 902). In an example where a wire feed welder is used, the speed or feed rates of the first and second wires may be adjusted to produce the desired content of the metallic element for the second weld layer. For example, in the example system 800, the wire feed welder 802 may feed the first wire 816 (e.g., which has a relatively lower chromium content) at a first rate and the second wire 818 (e.g., which has a relatively higher chromium content) at a second rate to produce the first weld layer 820. When producing the second weld layer 822, the wire feed welder 802 may feed the first wire 816 at a third rate, lower than the first rate, and/or the may feed the second wire 818 at a fourth rate, higher than the second rate. The resulting second weld layer 822 has a higher content of the metallic element (e.g., chromium) than the first weld layer 820.

In some examples, a plurality of weld layers may be deposited to gradually change the metallic element content between the ends of the first and second work pieces. In the example method 900, if another weld layer is to be deposited on the first weld layer (block 904), the method 900 includes depositing another weld layer (e.g., a second weld layer) on a previous weld layer (e.g., the first weld layer) (block 908). The additional weld layer may be deposited in a manner similar to the first weld layer (block 902). The additional weld layer has a higher content of the metallic element than the previous weld layer (e.g., the first weld layer). For example, in FIGS. 4 and 5, the second weld layer 412 (e.g., an additional weld layer) is deposited on the first weld layer 410 and has a higher chromium content than the first weld layer 410. In some examples, the additional weld layer is formed using a filler material with a different composition than the first weld layer. The filler material may be formed by braiding or twisting combinations of wires or rods such as, for example, as illustrated in Table 1, to produce a desired metallic element content. In some examples, such as in the example system of FIG. 8, the weld layers are formed by adjusting the feed rates of the first and second wires 816, 818. The example method 900 may include adjusting the feed rates of the first and second wires 816, 818 to result in the desired metallic element contents of the corresponding weld layers.

The example method 900 includes determining whether another weld layer is to be deposited (block 910). If another weld layer is to be deposited, the method 900 includes depositing another weld layer (e.g., a third weld layer) on the previous weld layer (e.g., the second weld layer) (block 908). The additional weld layer has a higher content of the metallic element than the previous weld layer (e.g., the second weld layer). The process of depositing an additional weld layer (blocks 908, 910) may be performed any number of times to produce a plurality of weld layers. Each time another weld layer is deposited, the additional weld layer has a higher content of the metallic element than the previous layers. Thus, as the weld layers are stacked on top of each other, the gradient of the metallic element content across the weld layers becomes more gradual.

If another weld layer is not to be deposited onto the previous weld layer (block 910), the example method 900 includes depositing a final weld layer between the previous weld layer and a second end of a second work piece (block 912). The second work piece has a higher content of the metallic element than the first work piece. The final weld layer has a higher chromium content than the first work piece and/or the previous weld layer. In some examples, the final weld layer has the same metallic element content as the previous weld layer. For example, the final weld layer 500 is deposited between the seventh weld layer 422 and the end 408 of the second work piece 404. The final weld layer 500 has a chromium content that is higher than the first chromium content of the first work piece 402 and/or the chromium content of the seventh weld layer 422. In some examples, the final weld layer 500 may have the same chromium content as the seventh weld layer 422. In this manner, weld layers are deposited between the first and second work pieces to couple the first and second work pieces together. Each of the weld layers has a metallic element content that is between the metallic element contents of the first and second work pieces. As a result, the gradient or change in the metallic element content between the first and second work pieces is more gradual and, thus, the likelihood of adverse welding effects is reduced and/or eliminated. In some examples, post-weld treatment may be performed on the weld (e.g., heat treatment).

The example method 900 may also be performed in reverse. In other words, the weld layers may be deposited onto the second end of the second work piece, starting with a weld layer having a lower content of the metallic element than the second work piece. In some examples, one or more weld layers may be deposited on each of the first and second work pieces, and a final weld layer may be deposited between the weld layers to couple the first and second work pieces together.

Figure 10:
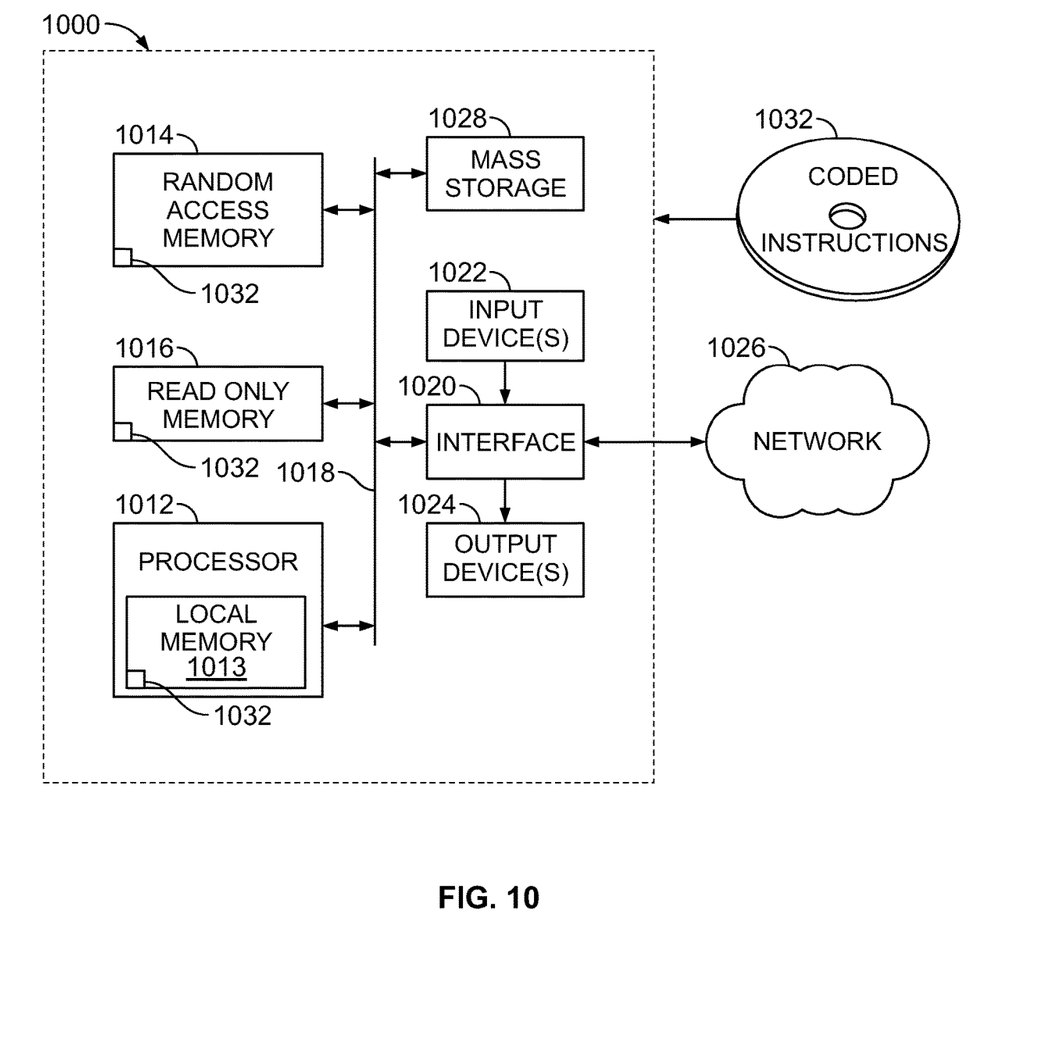
FIG. 10 is a diagram of a processor platform for use with the examples disclosed herein.

FIG. 10 is a block diagram of an example processor platform 1000 capable of executing instructions to implement at least a portion of the method of FIG. 9 and to produce one or more of the example welds of FIGS. 1-5 and 8 and/or implement the control system 824 of FIG. 8. The processor platform 1000 can be, for example, a server, a personal computer, a mobile device (e.g., a cell phone, a smart phone, a tablet such as an iPad™), a personal digital assistant (PDA), an Internet appliance or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

Coded instructions 1032 to implement at least a portion of the method of FIG. 9 may be stored in the mass storage device 1028, in the volatile memory 1014, in the non-volatile memory 816, and/or on a removable tangible computer readable storage medium such as a CD or DVD.

From the foregoing, it will be appreciated that the above disclosed methods and apparatus reduce and/or substantially eliminate adverse effects of welding two dissimilar work pieces (e.g., parts formed from different metal alloys) together. The example methods and apparatus utilize one or more weld layers having compositions or contents (e.g., chromium) that gradually transition from one of the work pieces to the other work piece. The methods and apparatus disclosed herein may be implemented to deposit a plurality of weld layers between two work pieces having different chromium contents, for example. The weld layers have chromium contents that are between the chromium contents of the two work pieces (e.g., within a range). As a result, the amount of carbon diffusion that would typically occur between the lower-chromium work piece and the higher-chromium work piece is reduced and/or substantially eliminated. Carbon diffusion causes a reduction in strength and/or creep resistance. Therefore, reducing and/or substantially eliminate carbon diffusion preserves the strength of the work pieces and/or the weld between them.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a first work piece having a first content of chromium by percentage of weight or mass;
    a second work piece having a second content of chromium;
    a base welded between the first work piece and the second work piece to couple the first work piece to the second work piece, the base having a same content of chromium as the first work piece, the base having a first end and a second end opposite the first end;
    a first weld layer deposited on the first end of the base between the first end of the base and the first work piece;
    a second weld layer deposited on the second end of the base, the second weld layer having a third content of chromium higher than the first content and lower than the second content; and
    a third weld layer deposited between the second weld layer and the second work piece, the third weld layer having a fourth content of chromium higher than the third content and lower than the second content.

2. The apparatus of claim 1, wherein the first and second work pieces are pipes.

3. The apparatus of claim 1, wherein the second weld layer forms a first bevel on the second end of the base.

4. The apparatus of claim 3, wherein the third weld layer is deposited between the first bevel of the first weld layer and a second bevel on the second work piece.

5. The apparatus of claim 1 further comprising weld layers disposed between the second weld layer and the third weld layer, each of the weld layers having a content of chromium that is higher than an adjacent one of the weld layers.

6. The apparatus of claim 1, wherein the first weld layer has a same content of chromium as the first work piece and the base.

* * * * *